Patented Oct. 12, 1937

2,095,275

UNITED STATES PATENT OFFICE 2,095,275

PREPARATION OF 1,3-DIHALO- AND 1,3,5-TRIHALOBENZENES

Johan Pieter Wibaut, Leonardus M. F. van de Lande, and Gerrit W. A. Wallagh, Amsterdam, Netherlands, assignors to The Dow Chemical Company, Midland, Mich., a corporation of Michigan No Drawing. Application May 27, 1935, Serial No. 23,718

9 Claims. (Cl. 260—161)

This invention concerns a method of preparing 1,3-dihalo- and 1,3,5-trihalobenzenes by brominating a lower halogenated benzene, e. g. a monohalobenzene, or benzene itself.

It is well known that under the conditions usually employed in brominating benzene, the first halogen atom entering the benzene ring tends to direct the next entering halogen atom to a position para or ortho thereto, with the result that only a very small yield of a 1,3-dihalo- or 1,3,5-trihalobenzene is obtained. For instance, when bromobenzene is reacted with an equimolecular proportion of bromine in the presence of ferric bromide at a temperature below 100° C., a mixture of isomeric dibromobenzenes containing about 85 per cent of the para-isomer, about 13 per cent of the ortho-isomer, and usually less than 2 per cent of the meta-isomer is obtained. When either the ortho- or para-dibromobenzene is further brominated, 1,2,4-tribromobenzene is formed as the principal tribrominated product. It is an object of the present invention to provide a method whereby benzene or a monohalobenzene may be brominated to produce a 1,3-dihalo- or 1,3,5-trihalobenzene in relatively high yield.

We have discovered that when such bromination is carried out at a temperature above 400° C., a relatively high proportion of 1,3-dihalo- and 1,3,5-trihalobenzenes are obtained, and that such compounds may frequently be formed as the principal reaction products. The invention, accordingly, consists in the method hereinafter fully described and particularly pointed out in the claims.

A halogenation according to our method is carried out by mixing benzene or a monohalobenzene, e. g. bromobenzene or chlorobenzene, with less than its molecular equivalent, preferably between 0.25 and 0.75 its molecular equivalent, of bromine and heating the mixture to a temperature between 400° and 700° C., preferably between 450° and 600° C., for a short time, e. g. less than 5 minutes and preferably less than 0.5 minute. The reactants, e. g. chlorobenzene and bromine, are preferably first passed separately, but in continuous flow, through preheaters wherein they are vaporized, if liquid, and heated to 250° C. or higher, and thence into a reaction chamber heated to between 400° and 700° C., wherein they are mixed and reacted. However, the halogen may first be dissolved in the liquid benzene or halobenzene reactant and the resultant liquid mixture be passed directly into the heated reaction chamber.

The mixture issuing from the reactor is cooled sufficiently to condense the organic components thereof and the residual hydrogen halide is passed onward to a suitable receiver where it is collected as a valuable by-product. The condensate is then fractionally distilled whereby a mixture of isomeric dihalobenzenes, rich in the meta-isomer, and a small proportion of 1,3,5-trihalobenzene, is obtained. The mixture of isomeric dihalobenzenes may be separated into its components by successive fractional distillation and crystallizations. The meta-dihalobenzene may be further halogenated as described above to produce a 1,3,5-trihalobenzene.

The following example illustrates one way in which the principle of our invention has been applied, but is not to be construed as limiting the invention.

Example

A liquid mixture of 80 grams (0.5 mol.) bromine and 157 grams (1 mol.) bromobenzene was permitted to drip, in 6.25 hours, into one end of a tubular reaction chamber of 2.2 centimeters internal diameter which was filled with pumice and heated over 50 centimeters of its length to approximately 480° C. During passage through said chamber, the mixture vaporized and reacted to form polybrominated benzenes and hydrogen bromide. The vapors issuing from the reaction chamber were cooled sufficiently to condense the brominated benzenes contained therein. The condensate was washed successively with aqueous solutions of sodium carbonate and potassium hydroxide, and with water, after which it was dried. There was obtained 188.2 grams of liquid material. The latter was fractionally distilled, whereby 50 grams of a dibromobenzene mixture, distilling at 218–224° C., was separated. This mixture was analyzed and found to contain approximately 22 per cent para-, 21 per cent ortho-, and 57 per cent meta-dibromobenzenes.

A mixed meta-dihalobenzene, e. g. 1-chloro-3-bromobenzene, or 1-fluoro-3-bromobenzene may be prepared by reacting a monohalobenzene such as fluorobenzene with bromine at high temperature. However, when iodobenzene is reacted with bromine in accordance with our method, the iodine originally present in the halobenzene is largely displaced by the bromine.

Instead of employing a monohalobenzene as a reactant in preparing a 1,3-dihalo- or 1,3,5-trihalobenzene by our method, benzene itself may be used. In such case, monobromo-benzene and a mixture of isomeric dibromo-benzenes, rich in the meta-isomer, are the principal products.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises reacting a compound selected from the class consisting of benzene, monohalo-benzenes and meta-dihalo-benzenes with bromine at a temperature between about 400° and about 700° C. to form, as a reaction product, a mixture of isomers of a compound selected from the class consisting of bromo-halo-benzenes and bromo-dihalo-benzenes, said mixture of isomers being rich in the isomer containing the halogen substituents in meta-position with respect to one another.

2. The method which comprises reacting a compound selected from the class consisting of benzene and monohalo-benzenes with bromine at a temperature between about 400° and about 700° C. to form a mixture of bromo-halo-benzenes rich in the meta-isomer.

3. The method which comprises mixing a compound selected from the class consisting of benzene and monohalo-benzenes with less than its molecular equivalent of bromine, passing the mixture through a reaction zone heated to a temperature between about 450° and about 600° C., cooling the mixture issuing from the reaction zone sufficiently to condense halogenated benzenes therefrom and separating a meta-bromo-halo-benzene from the condensate.

4. The method which comprises mixing a monohalo-benzene with less than its molecular equivalent of bromine and heating the mixture to a temperature between about 400° and about 700° C., whereby a reaction occurs with formation of a mixture of bromo-halo-benzenes rich in the meta-isomer.

5. The method which comprises mixing a monohalo-benzene with less than its molecular equivalent of bromine and passing the mixture through a reaction zone heated to a temperature between about 450° and about 600° C.

6. The method which comprises mixing bromobenzene with less than its molecular equivalent of bromine, and passing the mixture through a reaction zone heated to a temperature between about 400° and about 700° C.

7. The method which comprises mixing bromobenzene with less than its molecular equivalent of bromine, and passing the mixture through a reaction zone heated to a temperature between about 450° and about 600° C. at such rate that the reacting mixture traverses said zone in less than 0.5 minute.

8. The method which comprises mixing bromobenzene with less than its molecular equivalent of bromine, passing the mixture through a reaction zone heated to a temperature between about 450° and about 600° C. at such rate that the reacting mixture traverses said zone in less than 0.5 minute, and thereafter separating meta-dibromobenzene from the reacted mixture.

9. The method which comprises mixing a meta-dihalobenzene with less than its molecular equivalent of bromine, passing the mixture through a reaction zone heated to a temperature between about 450° and about 600° C. at such rate that the mixture traverses said zone in less than 0.5 minute, and thereafter separating a 1-bromo-3,5-dihalo-benzene product from the reacted mixture.

JOHAN P. WIBAUT.
LEO. M. F. van de LANDE.
G. WALLAGH.